US006488136B2

(12) United States Patent
Chang

(10) Patent No.: US 6,488,136 B2
(45) Date of Patent: Dec. 3, 2002

(54) RATCHET WHEEL STRUCTURE OF RATCHETING WRENCH

(76) Inventor: Chih-Ming Chang, No. 6, Nan Dih Lane, Sec. 1, Tan Shing Road, Tantzu Hsiang, Taichung Hsien (TW)

( * ) Notice: Subject to any disclaimer, the term of this patent is extended or adjusted under 35 U.S.C. 154(b) by 0 days.

(21) Appl. No.: 09/887,427

(22) Filed: Jun. 25, 2001

(65) Prior Publication Data

US 2001/0054531 A1 Dec. 27, 2001

(30) Foreign Application Priority Data

Jun. 26, 2000 (TW) .................................... 089211033 U

(51) Int. Cl.$^{7}$ ............................................... B29B 13/46
(52) U.S. Cl. ............................................... 192/46; 81/60
(58) Field of Search ........................ 192/46, 45.1, 43.1; 81/60, 63.1

(56) References Cited

U.S. PATENT DOCUMENTS 2,317,461 A * 4/1943 Jackson ......................... 81/60
2,764,048 A * 9/1956 Thompson ................. 81/57.29
4,991,468 A * 2/1991 Lee ............................. 81/185
5,636,557 A * 6/1997 Ma ............................... 81/60
6,148,695 A * 11/2000 Hu ............................... 81/60

* cited by examiner

*Primary Examiner*—Saul Rodriguez
(74) *Attorney, Agent, or Firm*—Troxell Law Office PLLC

(57) ABSTRACT

An improved ratchet wheel structure of a ratcheting wrench, having a restricting base at the bottom of the ratchet wheel, wherein the external diameter of the restricting base is slightly smaller than the diameter of the bottom hole on the fixing base of the ratchet wheel, and it extends to the intersection point of the ratchets of the ratchet wheel to form a serrated disk, and the ratchets aligned in parallel with the axial direction in the middle section of the ratchet wheel, and it extends to the intersection point of the positioning area such that the tip of the ratchets is corresponsive to the external diameter of the ratchet wheel, and a latching groove being disposed around an appropriate position in the positioning area such that a C-shaped buckle being latched into the latching groove for positioning. The ratchet wheel is embedded into the fixing groove of the ratchet wheel, and the serrated disk of the ratchet wheel and the restricting base just fit into the accommodating groove of the cross base and the restricting hole for the positioning, and the C-shape buckle will then be embedded into the inner edge of the hole in the accommodating groove such that the ratchet wheel in the accommodating groove will not fall off. Since the ratchets of the ratchet wheel are relatively of the same size as the external diameter of the ratchet wheel, the ratchets can keep its minimum external diameter for the ratchet wheel, and allow maximum effective ratchet diameter for the pawls of the blocking member for the engagement of the ratchets in order to strengthen the ratchets and avoid them from being cracked. In addition, the ratchet wheel and the ratchets are formed integrally to accomplish the effect of easy manufacture and quality inspection.

2 Claims, 5 Drawing Sheets

RATCHET WHEEL STRUCTURE OF RATCHETING WRENCH

BACKGROUND OF THE INVENTION

1. Field of the Invention

The present invention relates to an improved ratchet wheel structure of a ratcheting wrench, more particularly to a ratchet wheel structure using the external diameter of its axial ratchets corresponsive to the external diameter of the ratchet wheel for its production to improve the strength of the pawls of the blocking member which is for latching the ratchets of the ratchet wheel, and to avoid the ratchets from being cracked. The axial ratchet extends directly to the intersection point of the serrated disk of the ratchet wheel and allows an integral formation of the ratchet wheel structure for an easier manufacture and quality inspection.

2. Description of the Prior Art

The traditional ratcheting wrench such as the one described in the U.S. Pat. No. 6,148,695. For simplicity, such invention is depicted and disclosed in FIG. 1. In order to accomplish a smaller volume of the fixing base for the ratchet wheel, the ratchet A1 is disposed in the concession area B in the ratchet wheel A, and its external diameter is smaller than the external diameter of the ratchet wheel so that the ratchet formed is decreased with respect to the width of its wall, and it will reduce its strength. Furthermore, since the ratchets are deep inside the concession of the ratchet wheel, it has stricter accuracy requirement for its manufacture, and is more difficult to manufacture. In the mean time, since the ratchets are designed as an inwardly concave structure, therefore we are unable to inspect the quality of the ratchets by simple non-destructive instrument such as an overhead projector, and such shortcoming makes the inspection more difficult.

Further, please refer to FIG. 2. It shows another embodiment of the U.S. Pat. No. 6,148,695, which tries to solve the above-mentioned problem regarding the thickness of the wall by making the ratchets inside the concession area B as a straight serration A1' instead of the inwardly concave one, and provides higher accuracy to the manufacturing. Since it just fills up the concession of the ratchets as shown in FIG. 1, the external diameter of the ratchet is smaller than the external diameter of the ratchet wheel. What has been accomplished is just better than the strength of the structure as shown in FIG. 1. Since the ratchets are still deep inside the concession area B, we still cannot perform the quality inspection easily.

In view of the shortcomings of the prior art, which are the subjects of improvements for a long time, hence the inventor of the present invention based on years of experience accumulated from the engagement in the related industry conducted extensive research to resolve the foregoing shortcomings and invented the present invention.

Therefore, the primary objective of the present invention is to provide an improved ratchet wheel structure of a ratcheting wrench, wherein the external diameter of the ratchet wheel is slightly smaller than the hole diameter of the insert hole of the fixing base, and a restricting base is disposed at the bottom of the ratchet wheel. The external diameter of the ratchets is slightly smaller than the diameter of the insert hole on the fixing base, and a restricting base is disposed at the bottom, and the external diameter of the restricting base is slightly smaller than the diameter of the hole at the bottom of the fixing base, and it extends to the intersection point of the ratchets of the ratchet wheel to form a serrated disk. The ratchets are aligned parallel to the axial direction at the middle section of the positioning area and it extends to the intersection point of the positioning area such that the tip of the ratchet is corresponsive to the external diameter of the ratchet wheel. Furthermore, a latching groove is disposed at an appropriate position around the fixing area for latching the C-shape buckle into the latching groove in position, and the ratchet wheel is embedded into the fixing groove of the ratchet wheel such that the serrated disk of the ratchet wheel and the restricting base just fall into the cross base and the restricting hole of accommodating groove for the positioning. The C-shape buckle is then embedded into the inner edge of the insert hole of the accommodating groove such that the ratchet wheel in the accommodating groove will not fall out. Therefore, the ratchet of the ratchet wheel is corresponsive to the external diameter of the ratchet wheel such that the ratchet can keep the minimum external diameter of the ratchet wheel and obtain the maximum effective diameter of the ratchet. When the pawls of the blocking member are engaged with the ratchets, it strengthens the ratchets and avoids them from being cracked.

The secondary objective of the present invention is to provide an improved ratchet wheel structure for a ratcheting wrench, wherein the axial ratchets are disposed at the intersection position of the fixing area and the ratchets, and directly reach the serrated disk such that the ratchet wheel and the ratchets can be formed to allow easy manufacturing. Due to its semi-opened design, it does not need destructive examinations for the quality inspection and it makes the job of quality control easier.

To make it easier for our examiner to understand the objective of the invention, structure, innovative features, and performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 6:
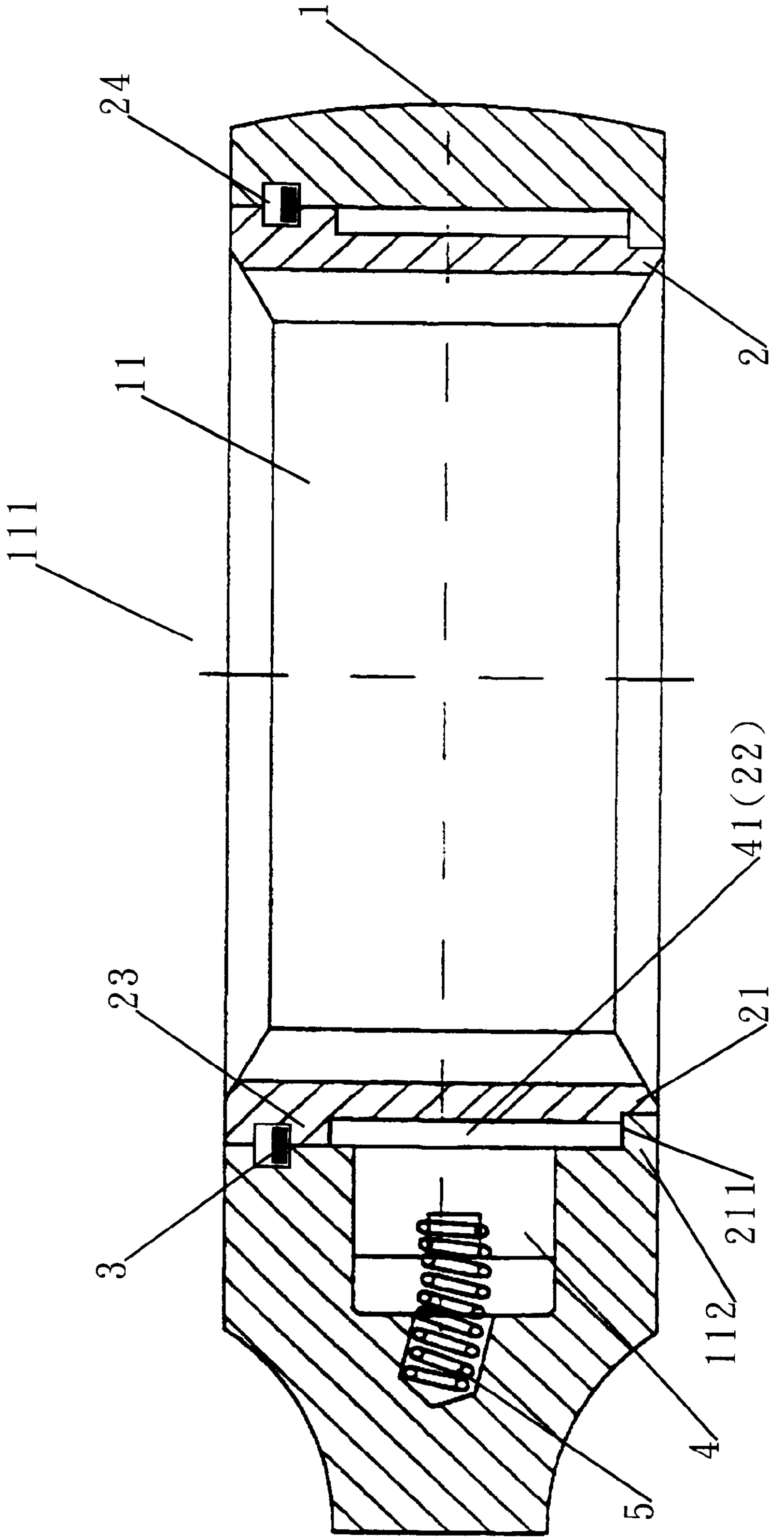
FIG. 6 is the cross-sectional diagram showing the assembly of the ratcheting wrench of the present invention.

Please refer to FIG. 6. An accommodating groove 11 of the ratchet wheel is disposed on the fixing base 1 of the ratchet wheel of the ratcheting wrench, and a cross base 112 is protruded at its rim at the bottom of the accommodating groove 11, and the diameter of the restricting hole 113 on the cross base 112 is slightly smaller than the diameter of the insert hole 111 at the upper section of the ratchet wheel.

Figure 1:
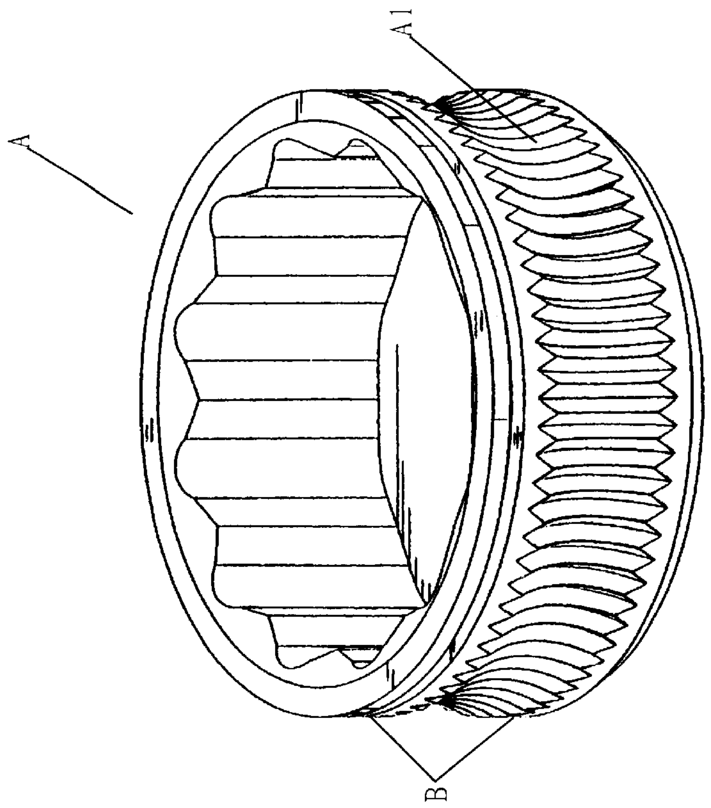
FIG1 PRIOR ART
FIG. 1 is a three-dimensional diagram showing the ratchet wheel of a ratcheting wrench according to the prior art.
Figure 2:
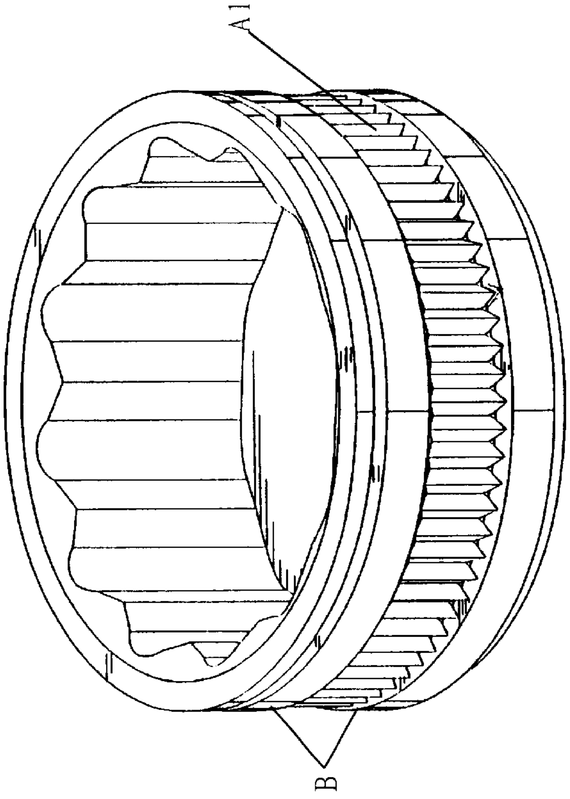
FIG2 PRIOR ART
FIG. 2 is a three-dimensional diagram showing another ratchet wheel of a ratcheting wrench according to the prior art.
Figure 3:
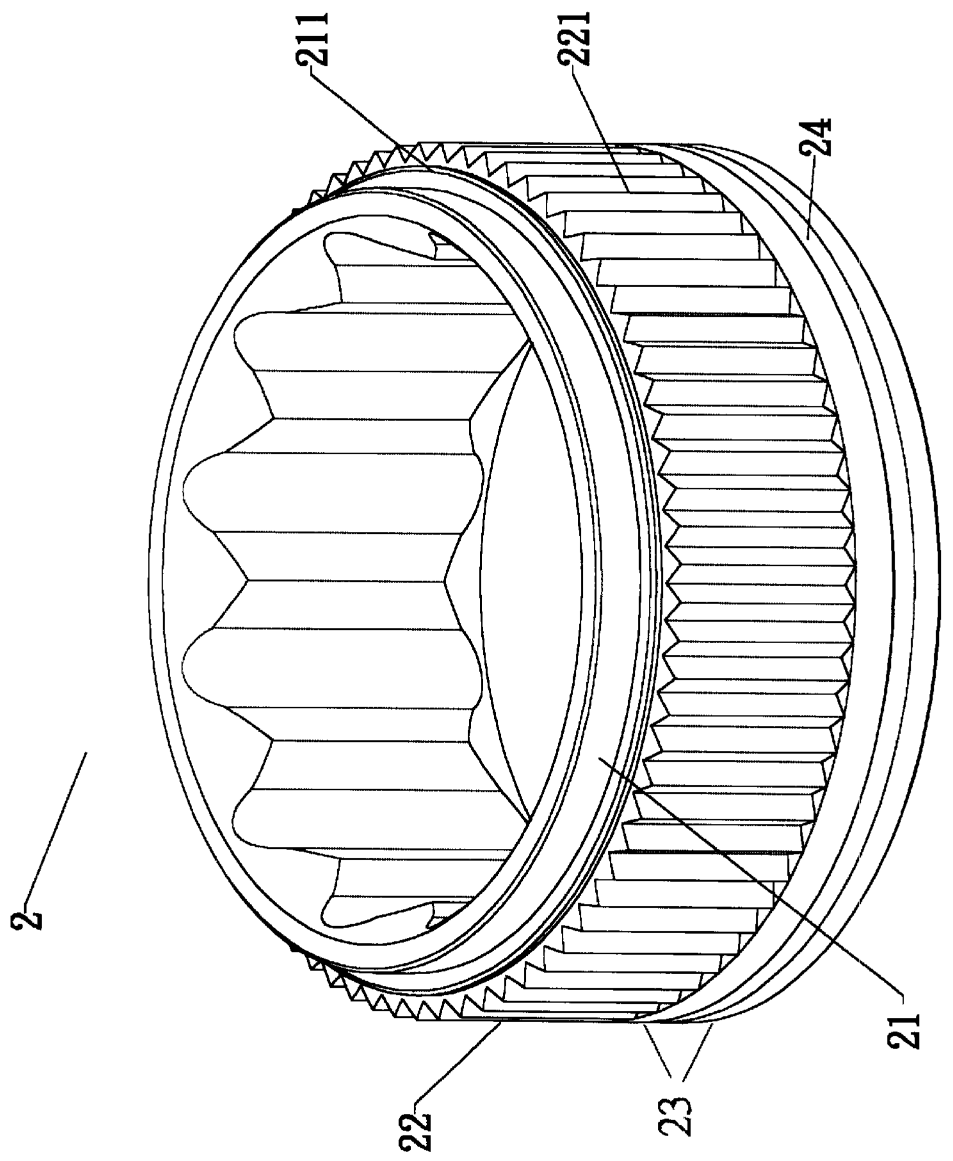
FIG. 3 is a three-dimensional diagram showing an embodiment of the present invention.
Figure 4:
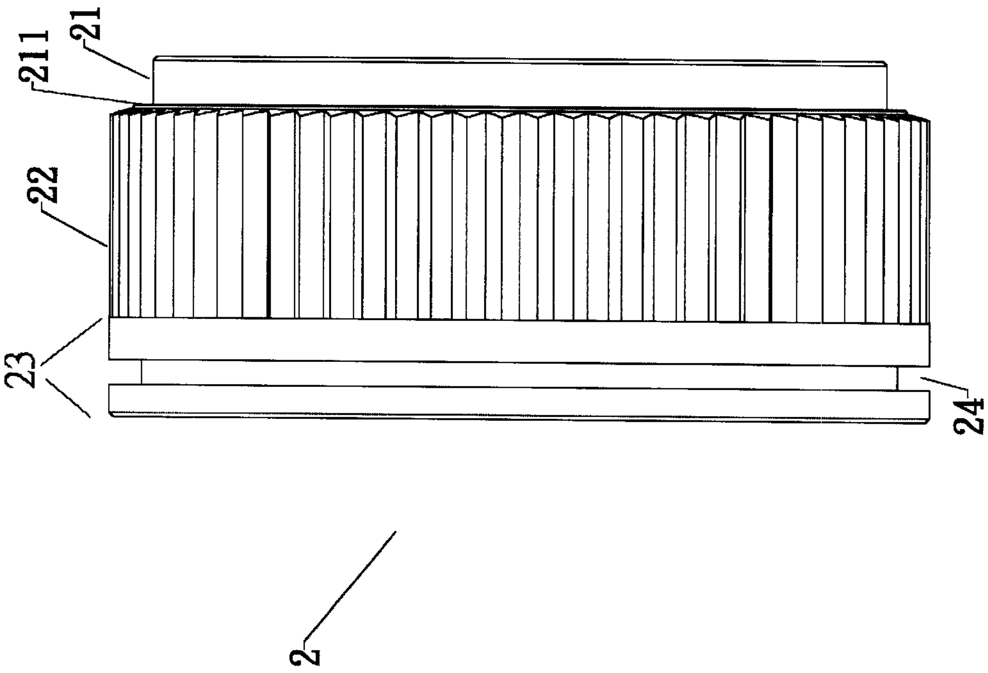
FIG. 4 is a side-view showing the ratchet wheel of a ratcheting wrench according to the present invention.
Figure 5:
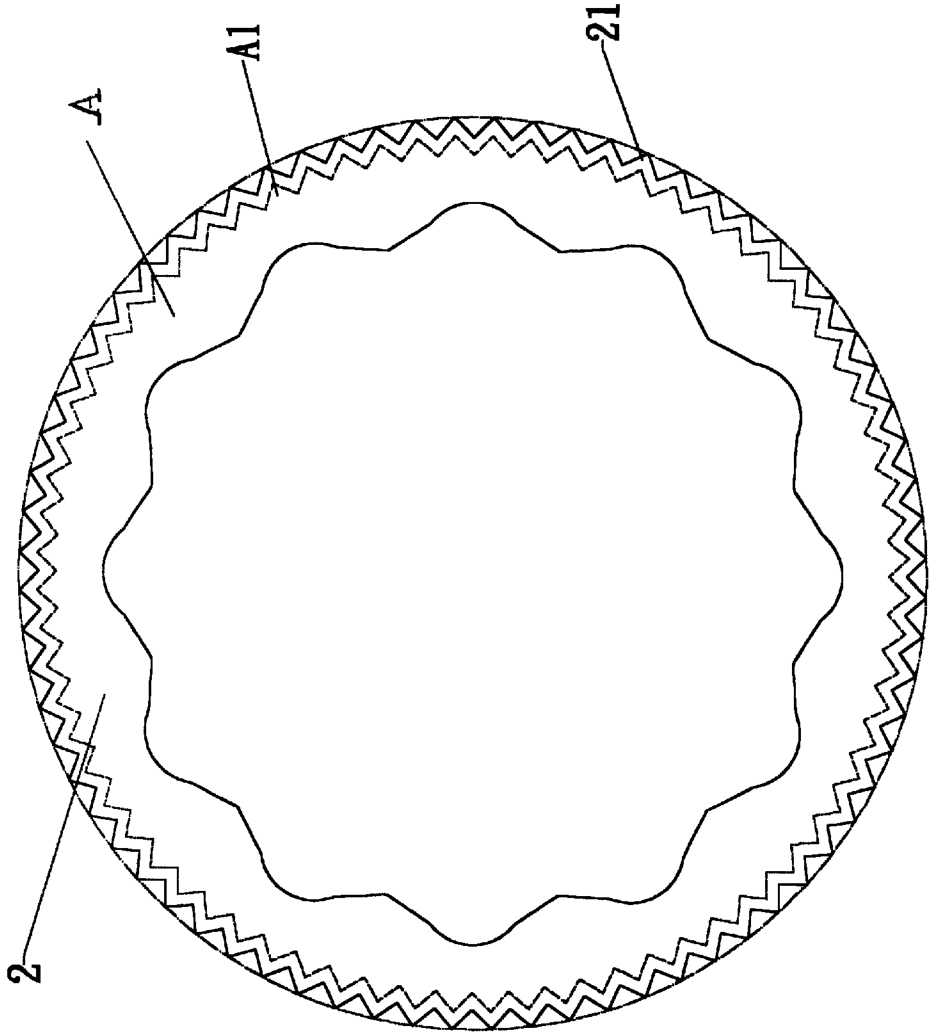
FIG. 5 is a comparison diagram showing the superimposition of the ratchet wheel of the present invention and that of the prior art.

Further, please refer to FIGS. 3 and 4. The external diameter of the ratchet wheel 2 is slightly smaller than the diameter of the insert hole 111 of the fixing base 1, and a restricting base 21 is disposed at the bottom of the ratchet wheel 2 such that the external diameter of the restricting base 21 is slightly smaller than the diameter of the restricting hole 113 of the fixing base 1 and it extends to the intersection point of the ratchets 22 of the ratchet wheel 2 to form a serrated disk 221. The ratchet is aligned parallel to the axial direction at the middle section of the ratchet wheel 2, and it extends to the intersection point in the positioning area 23, such that the tip 221 of the ratchet 22 is corresponsive to the ratchet wheel 2, and a latching groove 24 is disposed around an appropriate position in the positioning area 23 so that a C-shape buckle 3 is latched into the latching groove 24 for the positioning. The ratchet wheel 2 is then embedded into the accommodating groove 11 of the ratchet wheel, so that the serrated disk 221 of the ratchet wheel 2 and the restricting base 21 just fall into the cross base 112 and the restricting hole 113 of the accommodating groove 24 for the positioning. The C-shape buckle 3 is embedded into the inner edge of the insert hole 111 of the accommodating groove 11 such that the ratchet wheel 2 in the accommodating groove 11 will not fall off, and thus the ratchet 21 can keep the minimum external diameter of the ratchet wheel and the maximum effective diameter for the ratchets because the ratchets 21 of the ratchet wheel 2 are corresponsive to the external diameter of the ratchet wheel 2. It is known by comparing FIGS. 1 and 2 with FIG. 5, that shows the superimposition of the structure with the same specifications according to the present invention. Such arrangement makes the spring 5 to push the pawl 41 of the blocking member 4 to engage with the ratchet 21 and thus strengthens the ratchets and prevents the ratchets from being cracked (as shown in FIG. 6).

Please refer to FIGS. 3 and 4 again. The axial ratchet 22 extends from the position at the intersection of the positioning area 23 and the ratchets 22 directly to the serrated disk 221 such that the ratchet wheel 2 and the ratchets 22 can be integrally formed in order to provide an easy way for the manufacture. Furthermore, the semi-opened design of the structure does not require destructive examination for the quality inspection on the ratchets and makes the quality control easier.

Therefore, in summation of the above description, the present invention really improves the shortcomings of the prior art, which has been the research and development subject for enhancement. The inventor of the present invention based on years of experience in the related industry conducted extensive research to enhance the traditional structure herein which is hereby submitted for patent application.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An improved ratchet wheel structure for a ratcheting wrench, having an accommodating groove of a ratchet wheel on a fixing base of the ratchet of the ratcheting wrench, and a cross base being protruded from the rim at the bottom of the accommodating groove of the ratchet wheel, such that the diameter of a restricting hole on the cross base is slightly smaller than an insert hole at the upper end of the ratchet wheel, and the external diameter of the ratchet wheel is slightly smaller than the diameter of the insert hole of the fixing base, and a latching groove is disposed around an appropriate position in the positioning area for embedding a C-shape buckle into the latching groove for positioning, and the ratchet wheel being embedded into the accommodating groove of the ratchet wheel such that a serrated disk and a restricting base of the ratchet wheel just fall into the cross base and restricting hole of the accommodating groove for the positioning, and the C-shape buckle being embedded into the inner edge of the insert hole in the accommodating groove, thereby the ratchet wheel in the accommodating groove is secured from being fallen off; characterized in that:

a restricting base being disposed at the bottom of the ratchet wheel, such that the external diameter of the restricting base is slightly smaller than the diameter of the restricting hole of the fixing base and it extends to the intersection point of the ratchet of the ratchet wheel to form a serrated disk, and the ratchets being aligned parallel to the axial direction in the middle section of the ratchet wheel and it extends to the intersection point of the positioning section such that the tip of the ratchet is corresponsive to the external diameter of the ratchet wheel, and then the ratchet can keep the minimum external diameter for the ratchet wheel and obtain the maximum effective diameter for the ratchet so that when a spring pushes a pawl of a blocking member to engage the ratchet, it strengthens the ratchets and prevents the ratchets from being cracked.

2. An improved ratchet wheel structure for a ratcheting wrench as claimed in claim 1, wherein said axial ratchet extends from the position at the intersection point of the ratchet in the positioning section directly to the serrated disk, thereby the ratchet wheel and ratchet can be formed integrally that allows easy manufacturing, and since the semi-opened design, it does not need destructive examination for the quality inspection for the ratchets and it makes the quality control much easier.

* * * * *

UNITED STATES PATENT AND TRADEMARK OFFICE
Certificate

Patent No. 6,488,136 B2 Patented: December 3, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Chih-Ming Chang, Tantzu Hsiang, Taichung Hsien, Taiwan; Chen-Yu Lin, and Chang-Hua County, Taiwan.

Signed and Sealed this Twenty-third Day of August 2005.

CHARLES A. MARMOR
*Supervisory Patent Examiner*
Art Unit 3681